US009697395B2

(12) United States Patent
Mally et al.

(10) Patent No.: US 9,697,395 B2
(45) Date of Patent: Jul. 4, 2017

(54) MOBILE TAG READER PORTAL (71) Applicant: THE BOEING COMPANY, Chicago, IL (US)

(72) Inventors: Sujith N. Mally, Chicago, IL (US); Michael D. McInnis, Chicago, IL (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/329,107

(22) Filed: Jul. 11, 2014

(65) Prior Publication Data
US 2016/0012263 A1 Jan. 14, 2016

(51) Int. Cl.
G06K 7/10 (2006.01)
G01S 5/00 (2006.01)

(52) U.S. Cl.
CPC ........ G06K 7/10366 (2013.01); G01S 5/0009 (2013.01); G06K 7/10316 (2013.01)

(58) Field of Classification Search
CPC ............ G06K 7/10366; G06K 7/10316; G01S 5/0009
USPC ....................................... 340/10.1
See application file for complete search history.

(56) References Cited

U.S. PATENT DOCUMENTS

| 2005/0092825 | A1* | 5/2005 | Cox, Jr. | ............... | G06K 7/0008 235/375 |
| 2005/0245271 | A1* | 11/2005 | Vesuna | .................. | G06Q 10/08 455/456.1 |
| 2006/0109105 | A1* | 5/2006 | Varner | ............... | G08B 13/2462 340/539.12 |
| 2006/0208892 | A1* | 9/2006 | Ehrman | .................. | G06Q 10/08 340/572.1 |
| 2009/0085741 | A1 | 4/2009 | Ravi et al. | | |
| 2010/0295663 | A1* | 11/2010 | Shoarinejad | ........ | H04W 52/288 340/10.1 |
| 2011/0315765 | A1 | 12/2011 | Schantz et al. | | |

(Continued)

OTHER PUBLICATIONS

IEEE 802.11 2012 standard document, available at http://standards.ieee.org/getieee802/download/802.11-2012.pdf, Mar. 29, 2012.

(Continued)

*Primary Examiner* — Yong Hang Jiang
(74) *Attorney, Agent, or Firm* — Vista IP Law Group LLP; Cynthia A. Dixon (57) ABSTRACT

Systems, methods, and apparatus for identifying parts with electromagnetic identification (EMID) tags are disclosed. In one or more embodiments, a method involves receiving, with a first antenna(s) on a mobile EMID reader portal, a first signal(s) from an EMID tag(s). The method further involves transmitting, with a second antenna(s) on the mobile EMID reader portal, a second signal(s) to an access point(s). Also, the method involves transmitting, with the access point(s), a third signal(s) to an EMID processing system and a location processing system. In addition, the method involves determining, with the location processing system, the location of the mobile EMID reader portal. Additionally, the method involves transmitting, by the location processing system, the location of the mobile EMID reader portal to the EMID processing system. Further, the method involves associating, by the EMID processing system, the EMID tag(s) with the location of the mobile EMID reader portal.

19 Claims, 4 Drawing Sheets (56) References Cited

U.S. PATENT DOCUMENTS

| | | | | |
|---|---|---|---|---|
| 2012/0075072 A1* | 3/2012 | Pappu | ................. | H04B 5/0037 |
| | | | | 340/10.1 |
| 2013/0101134 A1* | 4/2013 | Betts-Lacroix | ........... | H04S 7/30 |
| | | | | 381/80 |
| 2014/0051407 A1* | 2/2014 | Ahearn | ................ | H04W 12/06 |
| | | | | 455/414.1 |

OTHER PUBLICATIONS

Enterprise Mobility 7.3 Design Guide, available at http://www.cisco.com/en/US/docs/solutions/Enterprise/Mobility/emob73dg/ch2_Arch.html#wp1101065, Chapter 2—Cisco Unified Wireless Technology and Architecture, pp. 2-1 to 2-28, Sep. 27, 2013.
Cisco Wireless Mesh Access Points, Design and Deployment Guide, Release 7.5, available at http://www.cisco.com/en/US/docs/wireless/technology/mesh/7.5/design/guide/mesh75.pdf, Aug. 31, 2013.
Canadian Office Action, CA Patent Application No. 2,888,550, Apr. 28, 2016.

* cited by examiner

MOBILE TAG READER PORTAL

FIELD

The present disclosure relates to mobile tags. In particular, it relates to mobile tag reader portals.

BACKGROUND

Currently, electromagnetic identification (EMID) tag asset management systems typically use short range readers and EMID tags to locate equipment, inventory, and other assets in real time as the tagged assets pass by non-mobile readers (e.g., when tagged assets pass fixed readers mounted near loading dock doors of a warehouse). The location of the tagged asset is recorded in an EMID tag management system as being in the location of the fixed, mounted reader. As such, the specific location (or zone) of where the tagged asset is ultimately delivered (e.g., stored or installed) within an area of interest (e.g., a continually changing manufacturing or assembly area, such as a warehouse) is unknown. As such, there is a need for an improved mobile EMID tag asset management system that provides the final location of the tagged asset.

SUMMARY

The present disclosure relates to a method, system, and apparatus for mobile tag reader portals. In one or more embodiments, a method for identifying parts with electromagnetic identification (EMID) tags involves receiving, with at least one first antenna on a mobile EMID reader portal, at least one first signal from at least one of the EMID tags, where at least one first signal comprises identification (ID) information. The method further involves transmitting, with at least one second antenna on the mobile EMID reader portal, at least one second signal comprising the ID information to at least one access point. Also, the method involves transmitting, with at least one access point, at least one third signal comprising the ID information to an EMID processing system and to a location processing system. Additionally, the method involves determining, with the location processing system, a location of the mobile EMID reader portal. Also, the method involves transmitting, by the location processing system, the location of the mobile EMID reader portal to the EMID processing system. Further, the method involves associating, by the EMID processing system, at least one of the EMID tags with the location of the mobile EMID reader portal.

In one or more embodiments, at least one third signal further comprises signal information relating to at least one second signal, and the location processing system determines the location of the mobile EMID reader portal by using the signal information relating to the at least one second signal. In at least one embodiment, the location processing system determines the location of the mobile EMID reader portal by performing triangulation with the signal information. In one or more embodiments, the location processing system determines the location of the mobile EMID reader portal by performing trilateration with the signal information. In some embodiments, the location processing system determines the location of the mobile EMID reader portal by performing ranging with the signal information. In one or more embodiments, the location processing system determines the location of the mobile EMID reader portal by using a EMID tag in a known location. In some embodiments, the location processing system determines the location of the mobile EMID reader portal by using a preset location.

In at least one embodiment, the method further involves determining, by the EMID processing system, a zone the mobile EMID reader portal is located in by using the location of the mobile EMID reader portal; and associating, by the EMID processing system, at least one of the EMID tags with the zone of the mobile EMID reader portal.

In some embodiments, at least one of the EMID tags is a radio frequency identification (RFID) tag, an ultra high frequency identification (UHFID) tag, a lightwave identification tag, an ultra-wideband (UWB) identification tag, an IEEE 802.15 tag, an IEEE 802.11 tag and/or a Wi-Fi identification (Wi-Fi ID) tag. In one or more embodiments, at least one of the EMID tags is an active tag, a passive tag, and/or a battery-assisted passive tag.

In one or more embodiments, at least one of the access points is a Wi-Fi access point, a satellite, or a cellular base station. In some embodiments, at least one access point transmits at least one third signal to the EMID processing system via a network and to the location processing system via the network.

In at least one embodiment, the method further involves storing, onto a database, the location of the mobile EMID reader portal for at least one of the EMID tags. In some embodiments, the database comprises metadata for at least one of the EMID tags. In some embodiments, the metadata comprises a part number, a serial number, a MAC address, a production date, an installation date, and/or test data.

In one or more embodiments, at least one first signal, at least one second signal, and at least one third signal further comprise at least one identifier (e.g., a time stamp related to when at least one of the signals was transmitted and/or received); and the method further involves storing, onto a database, at least one identifier for at least one of the EMID tags. In some embodiments, at least one second signal is transmitted on a dedicated Wi-Fi frequency channel, a cellular channel, or a satellite channel.

In one or more embodiments, at least one first signal, the at least one second signal, and the at least one third signal further comprise an operational health status of the mobile EMID reader portal; and the method further involves monitoring, by the EMID processing system, the health of the mobile EMID reader portal by using (e.g., by observing and evaluating) the operational health status. In at least one embodiment, the method further involves matching, by the EMID processing system, a name and/or a hostname in the mobile EMID reader portal with the location name and/or the zone name in which the mobile EMID reader portal is operating within for metadata purposes.

In at least one embodiment, a system for identifying parts with electromagnetic identification (EMID) tags involves a mobile EMID reader portal. The system further involves at least one first antenna on the mobile EMID reader portal to receive at least one first signal from at least one of the EMID tags, where at least one first signal comprises identification (ID) information. Also, the system involves at least one second antenna on the mobile EMID reader portal to transmit at least one second signal comprising the ID information to at least one access point. In addition, the system involves at least one access point to transmit at least one third signal comprising the ID information to an EMID processing system and to a location processing system. Additionally, the system involves the location processing system to determine a location of the mobile EMID reader portal, and to transmit the location of the mobile EMID reader portal to the EMID processing system. Further, the system involves the EMID processing system to associate at least one of the EMID tags with the location of the mobile EMID reader portal.

In one or more embodiments, at least one third signal further comprises signal information relating to at least one second signal, and the location processing system determines the location of the mobile EMID reader portal by using the signal information relating to at least one second signal. In at least one embodiment, the location processing system determines the location of the mobile EMID reader portal by performing triangulation with the signal information.

In at least one embodiment, an apparatus for identifying parts with electromagnetic identification (EMID) tags involves a mobile EMID reader portal comprising at least one first antenna to receive at least one first signal comprising identification (ID) information from at least one of the EMID tags, and at least one second antenna to transmit at least one second signal comprising the ID information to at least one access point. In one or more embodiments, at least one access point transmits at least one third signal comprising the ID information to an EMID processing system and to a location processing system. In at least one embodiment, the location processing system determines a location of the mobile EMID reader portal and transmits the location of the mobile EMID reader portal to the EMID processing system. In some embodiments, the EMID processing system associates at least one of the EMID tags with the location of the mobile EMID reader portal.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

DESCRIPTION

The methods and apparatus disclosed herein provide an operative system for mobile tag reader portals. The disclosed system provides a mobile tag reader portal that is able to read electromagnetic identification (EMID) tags associated with assets by rolling the mobile unit and temporarily placing the mobile unit in locations (or zones) in an area of interest (e.g., a manufacturing or assembly area) where the assets are ultimately delivered.

As previously mentioned above, currently, EMID tag asset management systems typically use short range readers and EMID tags to locate equipment, inventory, and other assets in real time as the tagged assets pass by non-mobile readers. The location of the tagged asset is recorded as being in the location of the mounted reader. As such, the location of where the tagged asset is ultimately delivered within an area of interest is unknown. The present disclosure provides a mobile tag reader portal that is able to provide the final location, within an area of interest, of a tagged asset.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with different wireless location systems and location systems configurations, and that the system described herein is merely one example embodiment of the invention.

For the sake of brevity, conventional techniques and components related to signal processing, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Figure 1:
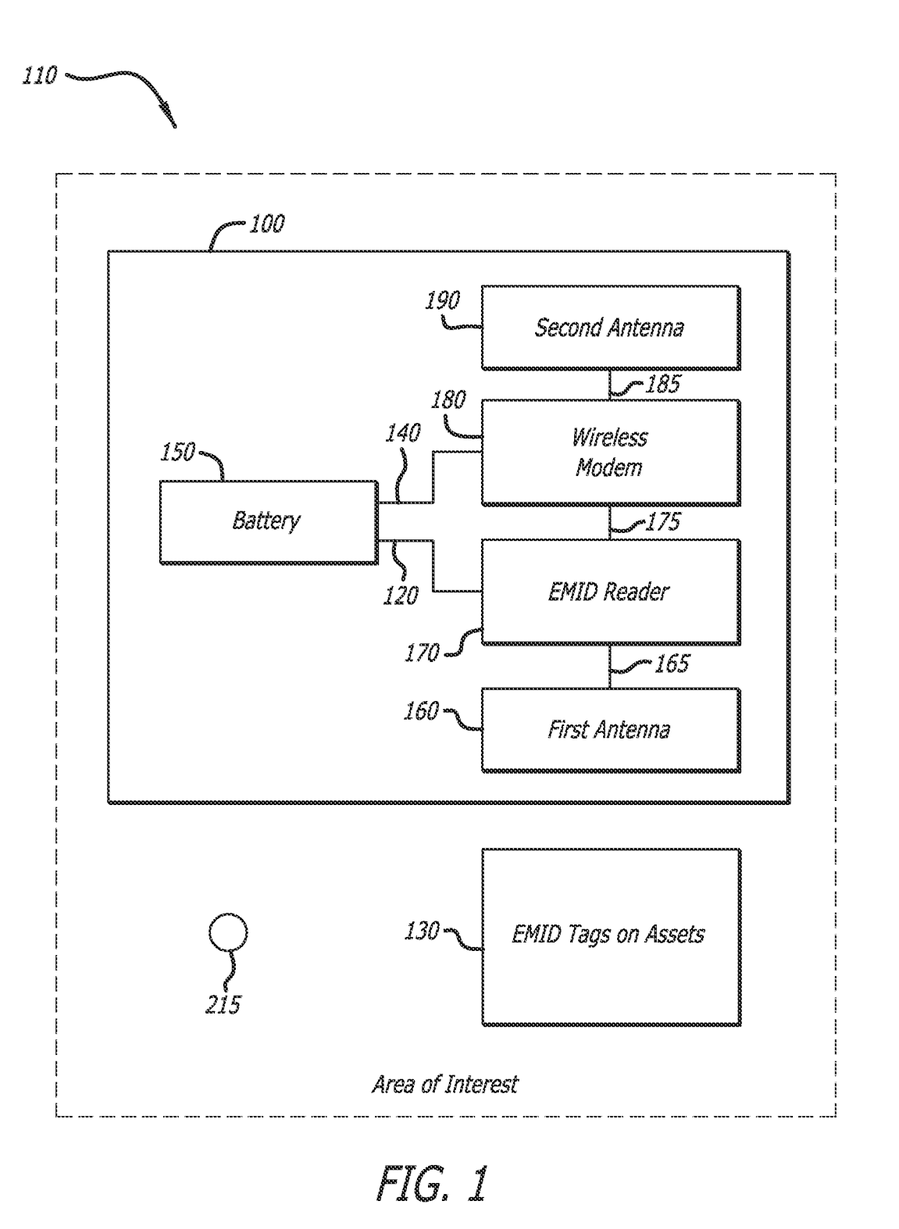
FIG. 1 is a schematic diagram of the disclosed mobile electromagnetic identification (EMID) reader portal in an area of interest containing assets with EMID tags, in accordance with at least one embodiment of the present disclosure.

FIG. 1 is a schematic diagram of the disclosed mobile electromagnetic identification (EMID) reader portal 100 in an area of interest 110 containing assets with EMID tags, in accordance with at least one embodiment of the present disclosure. In this figure, a mobile EMID reader portal 100 as well as EMID tags on assets 130 are shown to be located within an area of interest 110 (e.g., a warehouse). The mobile EMID reader portal 100 is essentially implemented as a mobile cart containing the necessary electronic equipment. In this figure, the mobile EMID reader portal 100 is shown to include a battery 150, a first antenna 160, an EMID reader 170, a wireless modem 180, and a second antenna 190. In addition, the battery 150 is shown to power the EMID reader 170 via wire 120, and the battery 150 is shown to also power the wireless modem 180 via wire 140. Also in this figure, the first antenna 160 is connected to the EMID reader 170 via wire 165 or wirelessly, the EMID reader 170 is connected to the wireless modem 180 via cable (e.g., a wire) 175 or wirelessly, and the wireless modem 180 is connected to the second antenna 190 via a cable (e.g., a wire) 185 or wirelessly. It should be noted that in some embodiments, the mobile EMID reader portal 100 may additionally include a third antenna (not shown).

It should be noted that the EMID tags on the assets 130 may be active tags, passive tags, or battery-assisted passive tags. In addition, the EMID tags may be radio frequency identification (RFID) tags, ultra high frequency identification (UHFID) tags, a lightwave identification tag, an ultra-wideband (UWB) identification tag, an IEEE 802.15 tag, an IEEE 802.11 tag or Wi-Fi identification (Wi-Fi ID) tags.

When the EMID tags on the assets 130 are passive tags, active tags, or battery-assisted passive tags; in one or more embodiments, the first antenna 160 transmits at least one query signal within the area of interest 110. The EMID tags on the assets 130 that are within range to receive the query signal radiate at least one first signal (e.g., a response signal) back to the first antenna 160.

It should be noted that in some embodiments, when the EMID tags on the assets 130 are active tags or battery-assisted passive tags, the EMID tags on the assets 130 may first simply transmit at least one first signal to the first antenna 160 without first receiving a query signal from the first antenna 160.

The first signal contains identification information for the specific EMID tags on the assets 130 that are within range. It should be noted that the type of EMID tags on the assets 130 will dictate the type of signals for the query signal and the first signal (e.g., if the tags are RFID tags, the query signal and the first signal will be radio frequency (RF) signals).

After the first antenna 160 receives the first signal, the first antenna sends the first signal to the EMID reader 170. The EMID reader 170 processes the first signal to obtain the identification information for the specific EMID tags on the assets 130 that are within range. The EMID reader 170 in turn sends the identification information to the wireless modem 180. The wireless modem 180 processes the identification information into at least one second signal. The wireless modem 180 sends the second signal to the second antenna 190 (and/or optionally to a third antenna (not shown)) for transmission. The second antenna 190 (and/or third antenna) transmits the second signal to at least one access point 215 located within the area of interest 110.

It should be noted that in one or more embodiments, the second signal is a Wi-Fi signal and the access point 215 is a Wi-Fi access point. For some embodiments, the Wi-Fi access point 215 is operating in "mesh mode" of the IEEE 802.11 standard so as to allow for a dedicated Wi-Fi channel for each access point 215. This dedicated channel will not interfere with or receive interference from standard Wi-Fi station transmissions. In one or more embodiments, the second antenna 190 (and/or third antenna) is configured to be in "child" mode, and the access point 215 is configured to be in "parent mode". However, it should also be noted that in other embodiments, the second signal and the access point 215 may communicate with each other by other electromagnetic means other than IEEE 802.11 Wi-Fi communications, such as by IEEE 802.15, lightwave, cellular, satellite, Bluetooth, or other electromagnetic spectrum (e.g., RF) communications. It should also be noted that in other embodiments, the access point 215 may be a satellite or a cellular base station. In addition, in some embodiments, the second signal and the access point 215 may communicate with each other by a cellular channel or a satellite channel.

Figure 2A:
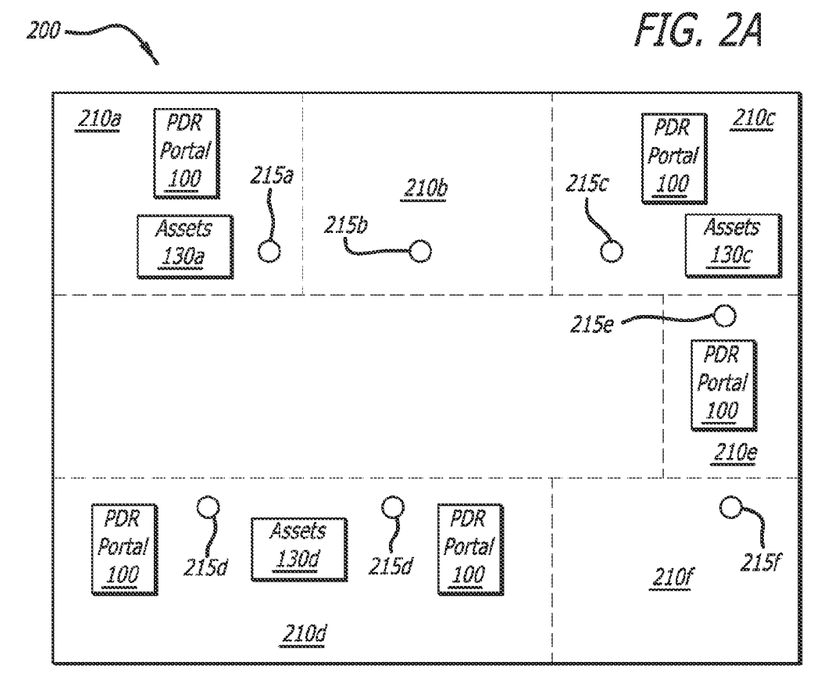
FIG. 2A is a schematic diagram of multiple mobile EMID reader portals in an area of interest with multiple zones containing assets with EMID tags, in accordance with at least one embodiment of the present disclosure.

FIG. 2A is a schematic diagram of multiple mobile EMID reader portals 100 in an area of interest 200 with multiple zones 210 containing assets with EMID tags 130, in accordance with at least one embodiment of the present disclosure. In this figure, the area of interest 200 is sectioned into multiple zones 210a-f. Assets with EMID tags 130a, 130c, 130d are shown to be located within some of the zones 210a, 210c, 210d. In addition, the zones 210a-f are each shown to include one or more access points 215a-d. During operation, the mobile EMID reader portals 100 are simply moved around the various zones 210a-f of the area of interest 200 to read the EMID tags on the assets 130a, 130c, 130d. It should be noted that access points 215 do not need to be positioned within a zone 210 to determine the mobile EMID reader portal's 100 location within that zone (e.g., access point 215b, which is located in zone 210b, may be utilized to determine the location of mobile EMID reader portal 100 in zone 210a).

Figure 2B:
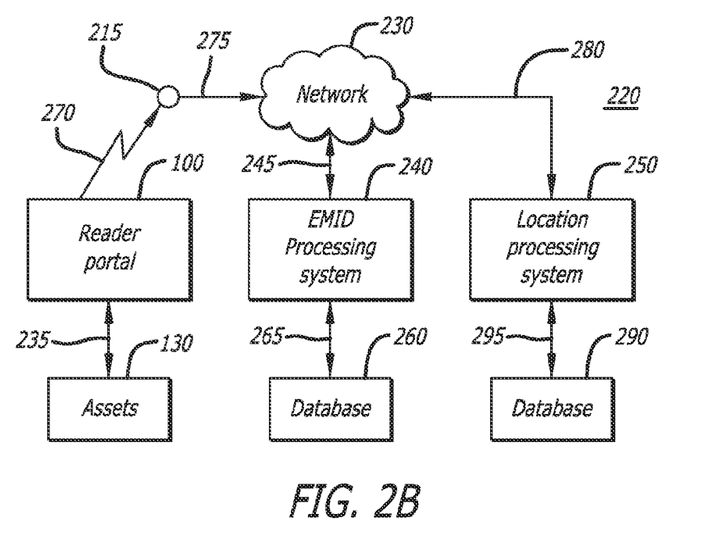
FIG. 2B is a schematic diagram of the disclosed system for identifying assets (e.g., parts) with EMID tags, in accordance with at least one embodiment of the present disclosure.

FIG. 2B is a schematic diagram of the disclosed system for identifying assets (e.g., parts) with EMID tags, in accordance with at least one embodiment of the present disclosure. In this figure, EMID tags on assets 130 are in communication with a mobile EMID reader portal 100 via electromagnetic communication (e.g., lightwave, RF, UHF, UWB frequency bands, IEEE 802.15, IEEE 802.11, or Wi-Fi) 235. In addition, the mobile EMID reader portal 100 is in communication with an access point 215 via IEEE 802.11 270. The access point 215 is connected to (e.g., in communication with) a network 230 by wire 275 or, alternatively wirelessly. In addition, an EMID processing system 240 is connected to the network 230 by wire 245 or, alternatively wirelessly. The EMID processing system 240 is connected to a database 260 by wire 265 or, alternatively wirelessly. In some embodiments, the EMID processing system 240 itself includes the database 260. Also a location processing system 250 is connected to the network 230 by wire 280 or, alternatively wirelessly. In addition, in one or more embodiments, the location processing system 250 is connected to a database 290 by wire 295 or, alternatively wirelessly. In some embodiments, the location processing system 250 itself includes the database 290.

During operation, when the EMID tags on the assets 130 are passive tags, active tags, or battery-assisted passive tags; in one or more embodiments, the first antenna (not shown) on the mobile EMID reader portal 100 transmits at least one query signal within the area of interest. The EMID tags on the assets 130 that are within range to receive the query signal radiate at least one first signal (i.e. a response signal) back to the first antenna on the mobile EMID reader portal 100.

In some embodiments, when the EMID tags on the assets 130 are active tags or battery-assisted passive tags, the EMID tags on the assets 130 may first simply transmit at least one first signal to the first antenna on the mobile EMID reader portal 100 without first receiving a query signal from the first antenna. The first signal contains identification information for the specific EMID tags on the assets 130 that are within range.

After the mobile EMID reader portal 100 receives the first signal (i.e. the response signal), the second antenna (not shown) on the mobile EMID reader portal 100 transmits at least one second signal, which contains the identification information, to at least one access point 215 located within the area of interest via Wi-Fi 270. For a more detailed discussion regarding how the mobile EMID reader portal 100 processes the first signal to generate the second signal, refer to the description of FIG. 1.

After the access point 215 receives the second signal, the access point 215 transmits at least one third signal, which includes the identification information, to an EMID processing system 240 and to a location processing system 250 via the network 230.

The location processing system 250 determines a location of the mobile EMID reader portal 100. In one or more embodiments, the third signal comprises signal information relating to the second signal, and the location processing system 250 determines the location of the mobile EMID reader portal 100 by using this second signal information (e.g., by performing triangulation, trilateration, and/or ranging with the signal information relating to the second signal). In some embodiments, the location processing system 250 determines the location of the mobile EMID reader portal 100 by using an EMID tag in a known location (e.g., when the mobile EMID reader portal 100 reads an EMID tag in a known location, the location processing system 250 (or the EMID processing system 240) determines that the mobile EMID reader portal 100 is in the same location as the EMID tag that was read). In at least one embodiment, the location processing system 250 determines the location of the mobile EMID reader portal 100 by using a preset location (e.g., the mobile EMID reader portal 100 is first moved to a preset location to have its initial location calibrated). In some embodiments, the EMID processing system 240 itself includes the location processing system 250 and the database 290.

The EMID processing system 240 queries the location processing system 250 for the location of the mobile EMID reader portal 100. The location processing system 250 transmits the location of the mobile EMID reader portal 100 to the EMID processing system 240 via the network 230. Then, the EMID processing system 240 associates the assets 130 of the read EMID tags with the location of the mobile EMID reader portal 100 (i.e. the EMID processing system 240 determines that the assets 130 of the read EMID tags are in the same location as the mobile EMID reader portal 100.

In at least one embodiment, the location processing system 250 sends the location of the mobile EMID reader portal 100 to database 290 to be stored. The database 290 includes metadata for at least one of the wireless modems (item 180 of FIG. 1) of the mobile EMID reader portals 100 and at least one of EMID tags (e.g., the database contains a lookup table comprising metadata for each of the wireless modems 180 and each of the EMID tags relating to their corresponding ID and location). Types of metadata that may be included in the database 290 include, but are not limited to, a MAC address, a serial number, and location data.

In one or more embodiments, the EMID processing system 240 determines the zone of the area of interest that the mobile EMID reader portal 100 is located in (e.g., determined by location information received from the location processing system 250), and associates the assets 130 of the read EMID tags with the zone of the mobile EMID reader portal 100 (i.e. the EMID processing system 240 determines that the assets 130 of the read EMID tags are in the same zone of the area of interest as the mobile EMID reader portal 100).

In at least one embodiment, the EMID processing system 240 sends the location (and/or zone) of the mobile EMID reader portal 100 to a database 260 to be stored. The database 260 includes metadata for the EMID tags on the assets 130 (e.g., the database contains a lookup table comprising metadata for each of the assets relating to their corresponding EMID tags). Type of metadata that may be included in the database include, but are not limited to, a part number, a serial number, a MAC address, a production date, an installation date, and test data.

In one or more embodiments, the first signal, the second signal, and the third signal each also include at least one identifier (ID) (e.g., a time stamp relating to when the any of the signals were transmitted and/or received). For these embodiments, the EMID processing system 240 sends the identifier information to the database 260 to be stored (e.g., the time stamp information is stored in a lookup table on the database 260 for the read EMID tag).

In at least one embodiment, the first signal, the second signal, and the third signal each also include an operational health status of the mobile EMID reader portal 100. For these embodiments, the operational health status of the mobile EMID reader portal 100 is received and monitored by the EMID processing system 240. The EMID processing system 240 monitors the health of the mobile EMID reader portal 100 by using (e.g., by observing and evaluating) the operational health status. Additionally, the EMID processing system 240 may report the operational health status to, for example, an information technology (IT) operations center when, for example, the operational health status indicates that a failure of the mobile EMID reader portal 100 has occurred. As an example, when the operational health status falls below a predetermined threshold (e.g., a threshold set to zero (0)), this will indicate that the mobile EMID reader portal 100 is either not operational or not located within its assigned zone (or location). If for example the operational health status falls below the predetermined threshold 50% of the time (e.g., five times out of ten readings the operational status falls below the threshold, and the remaining five times out of the ten readings the operational health status is above the threshold), it is likely that the mobile EMID reader portal 100 is operational, but is not located within its assigned zone (or location).

Figure 3:
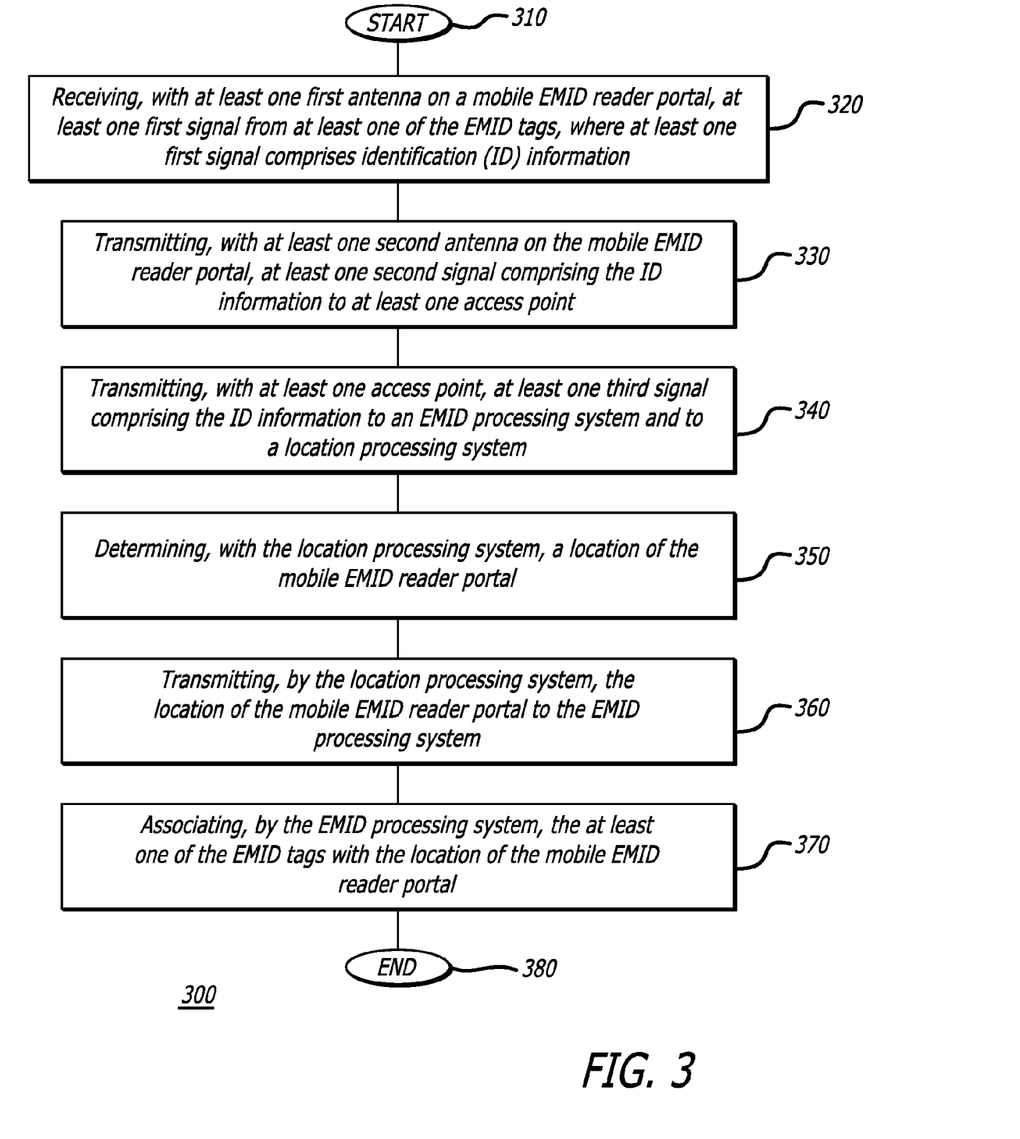
FIG. 3 is a flow chart for the disclosed method for identifying assets with EMID tags, in accordance with at least one embodiment of the present disclosure.

FIG. 3 is a flow chart for the disclosed method 300 for identifying assets with EMID tags, in accordance with at least one embodiment of the present disclosure. At the start 310 of the method 300, at least one first antenna on a mobile EMID reader portal receives at least one first signal from at least one of the EMID tags, where at least one first signal comprises identification (ID) information 320. Then, at least one second antenna on the mobile EMID reader portal transmits at least one second signal comprising the ID information to at least one access point 330. At least one access point then transmits at least one third signal comprising the ID information to an EMID processing system and to a location processing system 340. The location processing system determines a location of the mobile EMID reader portal 350. Then, the location processing system transmits the location of the EMID reader portal to the EMID processing system, and the location of the EMID reader portal is stored in the EMID processing system 360. Then, the EMID processing system associates at least one of the EMID tags with the location of the mobile EMID reader portal 370. Then, the method 300 ends 380.

Figure 4:
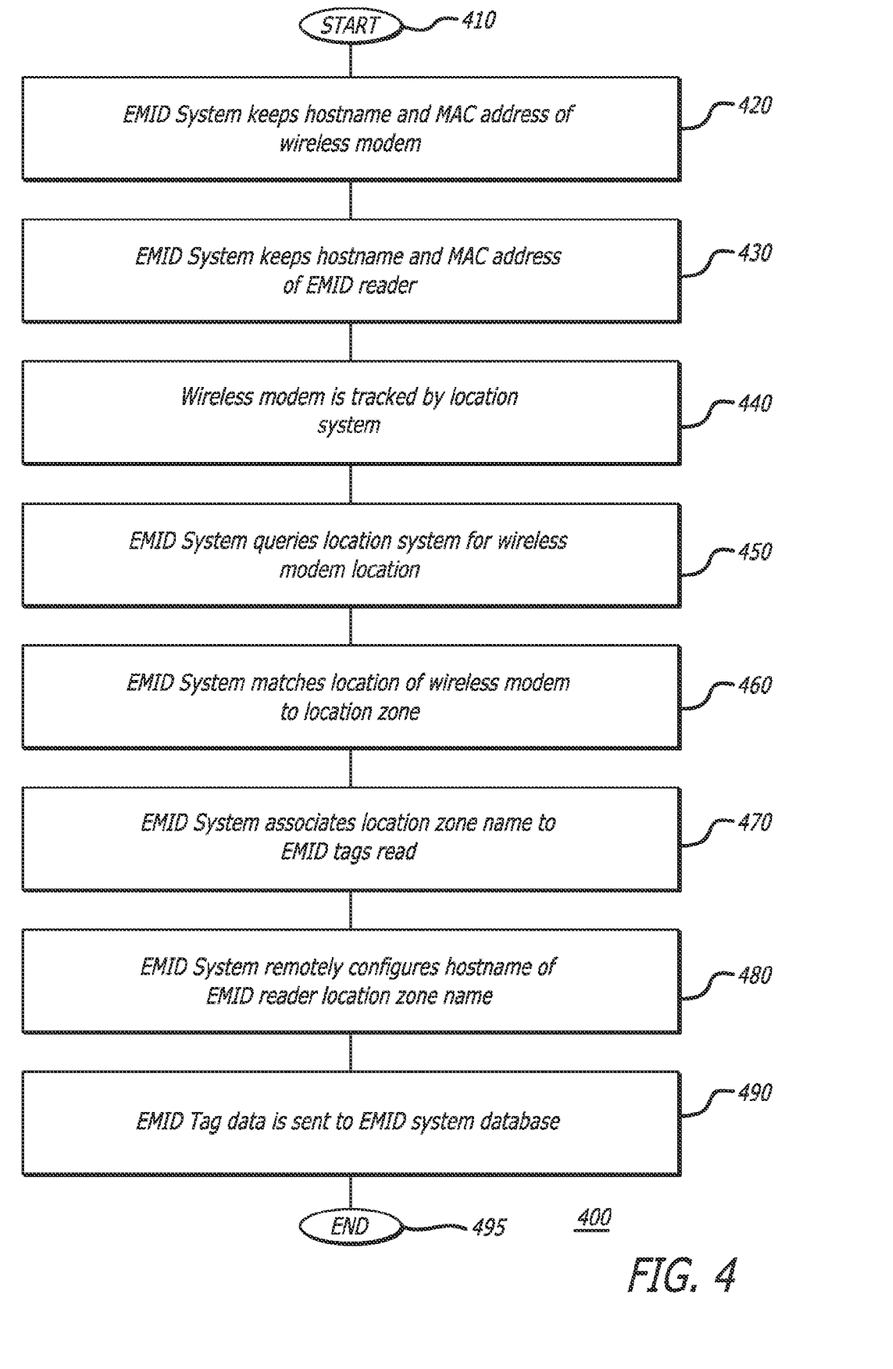
FIG. 4 is a flow chart for another disclosed method for identifying assets with EMID tags, in accordance with at least one embodiment of the present disclosure.

FIG. 4 is a flow chart for another disclosed method 400 for identifying assets with EMID tags, in accordance with at least one embodiment of the present disclosure. At the start of the method 400, an EMID processing system keeps (e.g., stores in a database) identification (e.g., a hostname and medium access control (MAC) address) of the wireless modem of the mobile EMID reader portal 420. The EMID processing system keeps (e.g., stores in a database) identification (e.g., a hostname and MAC address) of the EMID reader of the mobile EMID reader portal 430. The location processing system tracks the location of the wireless modem of the mobile EMID reader portal 440. The EMID processing system queries the location processing system for the location of the wireless modem of the mobile EMID reader portal 450. The EMID processing system matches (or associates) the location of the wireless modem of the mobile EMID reader portal to a location zone 460. The EMID processing system associates the location zone name (e.g., zone 1) to the EMID tags read by the mobile EMID reader portal 470. The EMID processing system, optionally, remotely configures the hostname of the EMID reader to the location zone name 480. The EMID tag data (e.g., the identification information) is sent to the database (e.g., the location (e.g., the zone name) of the EMID tag is stored a lookup table of a database for that specific EMID tag number) 490. Then, the method 400 ends 495.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. It should be noted that, for example, some (or all) of the steps of method 400 of FIG. 4 may be implemented into the method 300 of FIG. 3. For instance, in one example, step 450, of FIG. 4, that deals with the EMID processing system querying the location processing system for the location of the wireless modem of the mobile EMID reader portal may be implemented before step 350, which deals with the location processing system determining a location of the mobile EMID reader portal, of method 300 of FIG. 3. In another example, step 440, of FIG. 4, that deals with the location processing system tracking the location of the wireless modem of the mobile EMID reader portal may be implemented after step 350, which deals with the location processing system determining a location of the mobile EMID reader portal, of method 300 of FIG. 3. In addition, it should be noted that, in some embodiments, some (or all) of the steps of method 300 of FIG. 3 may be implemented into the method 400 of FIG. 4. For example, step 360, of FIG. 3, that deals with the location processing system transmitting the location of the EMID reader portal to the EMID processing system may be implemented after step 450, which deals with the EMID processing system querying the location processing system for the location of the wireless modem of the mobile EMID reader portal, of method 400 of FIG. 4.

Where methods described above indicate certain events occurring in certain order, those of ordinary skill in the art having the benefit of this disclosure would recognize that the ordering may be modified and that such modifications are in accordance with the variations of the invention. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for identifying parts with electromagnetic identification (EMID) tags, the method comprising:
   receiving, with at least one first antenna on a mobile EMID reader portal, at least one first signal from at least one of the EMID tags, wherein the at least one first signal comprises identification (ID) information;
   transmitting, with at least one second antenna on the mobile EMID reader portal, at least one second signal comprising the ID information to at least one access point;
   transmitting, with the at least one access point, at least one third signal comprising the ID information to an EMID processing system and to a location processing system, wherein the at least one third signal further comprises signal information relating to the at least one second signal;
   determining, with the location processing system, a location of the mobile EMID reader portal by using the signal information relating to the at least one second signal;
   transmitting, by the location processing system, the location of the mobile EMID reader portal to the EMID processing system;
   associating, by the EMID processing system, the at least one of the EMID tags with the location of the mobile EMID reader portal; and
   matching, by the EMID processing system, at least one of a name or a hostname in the mobile EMID reader portal with at least one of a location name or a zone name in which the mobile EMID reader portal is operating within for metadata purposes.

2. The method of claim 1, wherein the location processing system determines the location of the mobile EMID reader portal by performing at least one of triangulation with the signal information or trilateration with the signal information.

3. The method of claim 1, wherein the location processing system determines the location of the mobile EMID reader portal by performing ranging with the signal information.

4. The method of claim 1, wherein the location processing system determines the location of the mobile EMID reader portal by using a EMID tag in a known location.

5. The method of claim 1, wherein the location processing system determines the location of the mobile EMID reader portal by using a preset location.

6. The method of claim 1, wherein the method further comprises: determining, by the EMID processing system, a zone the mobile EMID reader portal is located in by using the location of the mobile EMID reader portal; and
   associating, by the EMID processing system, the at least one of the EMID tags with the zone of the mobile EMID reader portal.

7. The method of claim 1, wherein at least one of the EMID tags is one of a radio frequency identification (RFID) tag, an ultra high frequency identification (UHFID) tag, a lightwave identification tag, an ultra-wideband (UWB) identification tag, an IEEE 802.15 tag, an IEEE 802.11 tag, or a Wi-Fi identification (Wi-Fi ID) tag.

8. The method of claim 1, wherein at least one of the EMID tags is one of an active tag, a passive tag, or a battery-assisted passive tag.

9. The method of claim 1, wherein at least one of the at least one access point is one of a Wi-Fi access point, a satellite, or a cellular base station.

10. The method of claim 1, wherein the at least one access point transmits the at least one third signal to the EMID processing system via a network and to the location processing system via the network.

11. The method of claim 1, wherein the method further comprises storing, onto a database, the location of the mobile EMID reader portal for the at least one of the EMID tags.

12. The method of claim 11, wherein the database comprises metadata for the at least one of the EMID tags.

13. The method of claim 12, wherein the metadata comprises at least one of a part number, a serial number, a MAC address, a production date, an installation date, or test data.

14. The method of claim 1, wherein the at least one first signal, the at least one second signal, and the at least one third signal further comprise at least one identifier, and wherein the method further comprises storing, onto a database, the at least one identifier for the at least one of the EMID tags.

15. The method of claim 1, wherein the at least one second signal is transmitted on one of a dedicated Wi-Fi frequency channel, a cellular channel, or a satellite channel.

16. The method of claim 1, wherein the at least one first signal, the at least one second signal, and the at least one third signal further comprise an operational health status of the mobile EMID reader portal, and
wherein the method further comprises monitoring, by the EMID processing system, a health of the mobile EMID reader portal by using the operational health status.

17. A system for identifying parts with electromagnetic identification (EMID) tags, the system comprising:
a mobile EMID reader portal;
at least one first antenna on the mobile EMID reader portal to receive at least one first signal from at least one of the EMID tags, wherein the at least one first signal comprises identification (ID) information;
at least one second antenna on the mobile EMID reader portal to transmit at least one second signal comprising the ID information to at least one access point;
the at least one access point to transmit at least one third signal comprising the ID information to an EMID processing system and to a location processing system,
wherein the at least one third signal further comprises signal information relating to the at least one second signal;
the location processing system to determine a location of the mobile EMID reader portal by using the signal information relating to the at least one second signal, and to transmit the location of the mobile EMID reader portal to the EMID processing system;
the EMID processing system to associate the at least one of the EMID tags with the location of the mobile EMID reader portal; and
matching, by the EMID processing system, at least one of a name or a hostname in the mobile EMID reader portal with at least one of a location name or a zone name in which the mobile EMID reader portal is operating within for metadata purposes.

18. An apparatus for identifying parts with electromagnetic identification (EMID) tags, the apparatus comprising:
a mobile EMID reader portal comprising at least one first antenna to receive at least one first signal comprising identification (ID) information from at least one of the EMID tags, and at least one second antenna to transmit at least one second signal comprising the ID information to at least one access point,
wherein the at least one access point transmits at least one third signal comprising the ID information to an EMID processing system and to a location processing system, wherein the at least one third signal further comprises signal information relating to the at least one second signal, wherein the location processing system determines a location of the mobile EMID reader portal by using the signal information relating to the at least one second signal and transmits the location of the mobile EMID reader portal to the EMID processing system, and wherein the EMID processing system associates the at least one of the EMID tags with the location of the mobile EMID reader portal; and,
matching, by the EMID processing system, at least one of a name or a hostname in the mobile EMID reader portal with at least one of a location name or a zone name in which the mobile EMID reader portal is operating within for metadata purposes.

19. The method of claim 1, wherein the EMID tags are located within an area of interest, wherein the area of interest comprises a plurality of zones, and wherein each of the zones comprises at least one of the at least one access point.

* * * * *